(12) United States Patent
Guo et al.

(10) Patent No.: US 12,069,541 B2
(45) Date of Patent: Aug. 20, 2024

(54) TERMINAL DEVICE LOCATION DETERMINING METHOD AND DEVICE

(71) Applicant: HUAWEI TECHNOLOGIES CO., LTD., Shenzhen (CN)

(72) Inventors: Longhua Guo, Shanghai (CN); He Li, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 329 days.

(21) Appl. No.: 17/513,418

(22) Filed: Oct. 28, 2021

(65) Prior Publication Data
US 2022/0053294 A1 Feb. 17, 2022

Related U.S. Application Data

(63) Continuation of application No. PCT/CN2020/087643, filed on Apr. 29, 2020.

(30) Foreign Application Priority Data

Apr. 29, 2019 (CN) .......................... 201910356562.2

(51) Int. Cl.
*H04W 4/029* (2018.01)
(52) U.S. Cl.
CPC .................. *H04W 4/029* (2018.02)
(58) Field of Classification Search
CPC ... H04W 4/029; H04W 64/00; H04W 64/006; G01S 5/0205; G01S 5/021; G01S 5/0244
See application file for complete search history.

(56) References Cited

U.S. PATENT DOCUMENTS

| | | | |
|---|---|---|---|
| 2016/0128017 A1* | 5/2016 | Qiu ......................... | G01S 19/21 455/456.5 |
| 2016/0165401 A1* | 6/2016 | Harper .................... | G01S 19/48 455/456.1 |
| 2019/0037529 A1 | 1/2019 | Edge et al. | |

FOREIGN PATENT DOCUMENTS

| | | |
|---|---|---|
| CN | 101312584 A | 11/2008 |
| CN | 101339238 A | 1/2009 |

(Continued)

OTHER PUBLICATIONS

CN105472737 A) discloses a terminal positioning method and server. (Year: 2016).*

(Continued)

*Primary Examiner* — Siu M Lee
(74) *Attorney, Agent, or Firm* — HAUPTMAN HAM, LLP

(57) ABSTRACT

A method includes receiving, from a gateway mobile location center, a reliable positioning requirement for obtaining the location of a terminal device. The method also includes determining based on the received reliable position requirement a positioning method that is based on the terminal device reporting and a network-assisted positioning. The method further includes obtaining a first location reported by the terminal device and a second location reported by a base station. The method additionally includes determining location information of the terminal device based on the first location and the second location. The method also includes sending a positioning response to an application function entity from the gateway mobile location center. The positioning response comprises the location information of the terminal device.

11 Claims, 8 Drawing Sheets

(56) References Cited

FOREIGN PATENT DOCUMENTS

| | | |
|---|---|---|
| CN | 104883663 A | 9/2015 |
| CN | 105472737 A | 4/2016 |

OTHER PUBLICATIONS

3GPP Draft; S3-191369,Huawei et al: "A solution to prevent from providing faked/altered location estimate", Apr. 29, 2019,total 2 pages.
European Search Report issued in corresponding European Application No. 20798919.5, dated Apr. 26, 2022, pp. 1-10.
SA WG2 Meeting #127,S2-183951, Solution 5 Update: Privacy Check procedure W.R.T. LMF based architecture,vivo, OTD, Apr. 16-20, 2018, Sanya, China, total 3 pages.
SA WG2 Meeting #117, S2-166200, Addition of Impacts and Evaluations for Location Services Solutions, Qualcomm Incorporated, Oct. 19-23, 2016, Kaohsiung City, Taiwan, total 13 pages.
3GPP TS 23.502 V15.3.0 (Sep. 2018), 3rd Generation Partnership Project; Technical Specification Group Services and System Aspects; Procedures for the 5G System; Stage 2 (Release 15), dated Sep. 17, 2018, total 329 pages.
International Search Report issued in corresponding International Application No. PCT/CN2020/087643, dated Jun. 18, 2020, pp. 1-10.
Chinese Office Action issued in corresponding Chinese Application No. 201910356562.2, dated Apr. 1, 2021, pp. 1-6.
Chinese Search Report issued in corresponding Chinese Application No. 201910356562.2, dated Mar. 23, 2021, pp. 1-3.

* cited by examiner

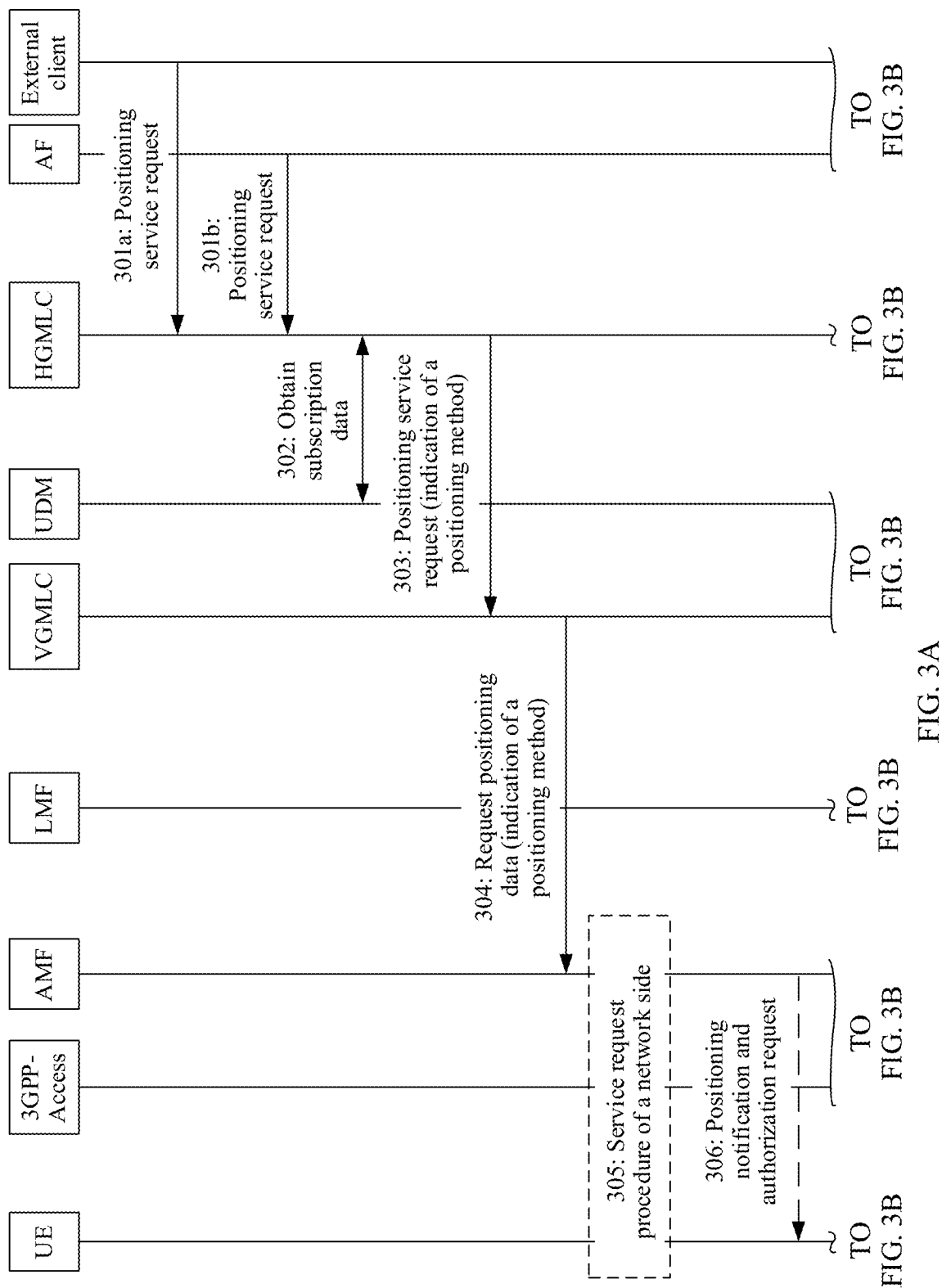

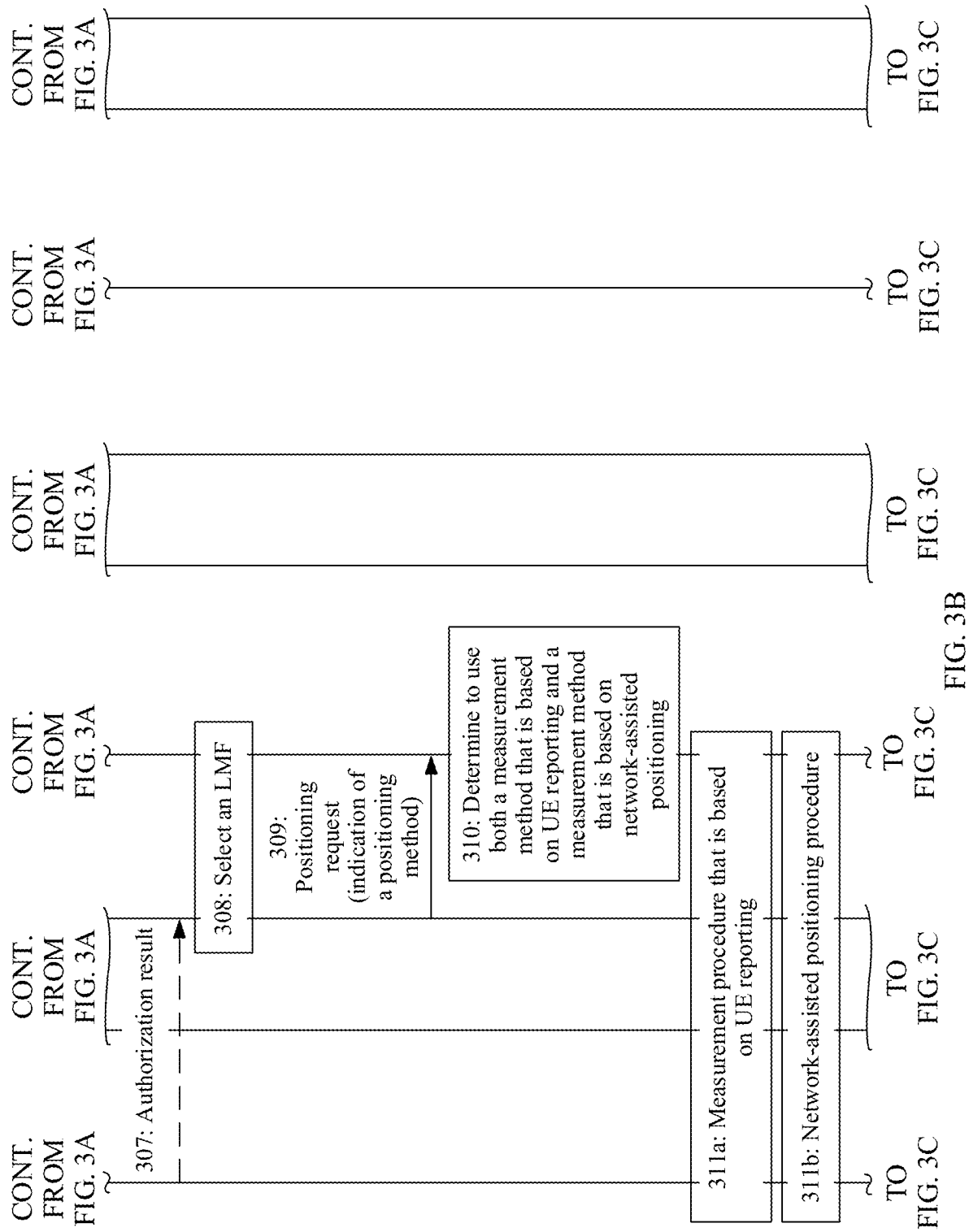

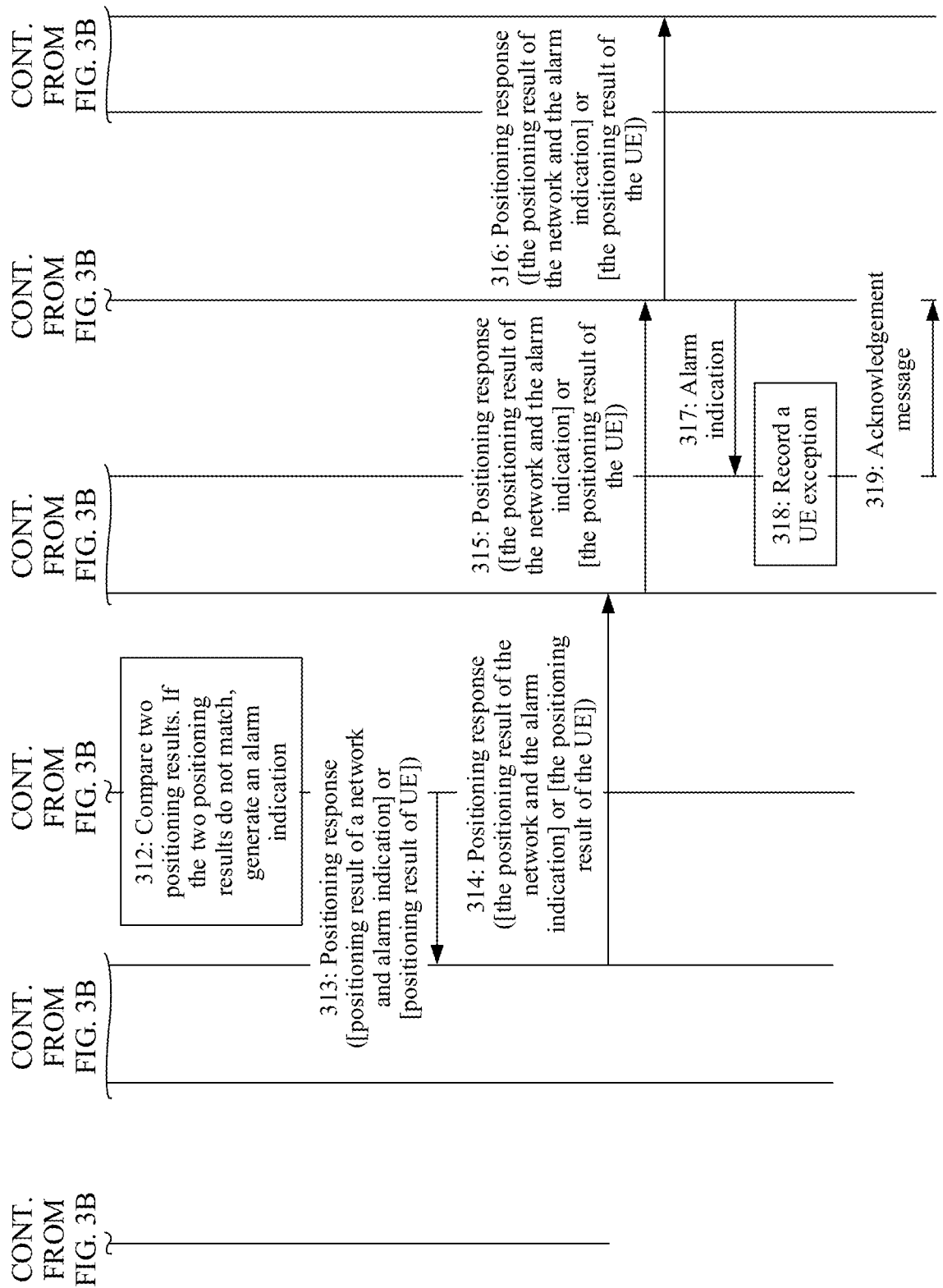

TERMINAL DEVICE LOCATION DETERMINING METHOD AND DEVICE

CROSS-REFERENCE TO RELATED APPLICATIONS

This application is a continuation of International Application No. PCT/CN2020/087643, filed on Apr. 29, 2020, which claims priority to Chinese Patent Application No. 201910356562.2, filed on Apr. 29, 2019. The disclosures of the aforementioned applications are hereby incorporated by reference in their entireties.

TECHNICAL FIELD

Embodiments of this application relate to the field of communication technologies, and in particular, to a terminal device location determining method and a device.

BACKGROUND

In a terminal-based positioning method, a terminal performs positioning measurement and calculation, and reports a calculation result to a network side. If the terminal reports false measurement data or a false calculation result, an external client (for example, another functional entity or application server) obtains an incorrect positioning result. This will cause a potential security risk. An existing positioning technology cannot detect whether measurement data or a calculation result reported by the terminal is false. If the measurement data or the calculation result is false, services such as location tracking related to positioning and location-based charging are affected.

SUMMARY

Embodiments of this application provide a terminal device location determining method and a device. In the method, a core network device determines, by comparing location information provided by a base station with location information provided by a terminal device, whether a location of the terminal device is incorrect, so that positioning accuracy and reliability can be both considered.

In a positioning method that is based on terminal device reporting in a current technology, a terminal device may upload false measurement data or a tampered positioning result. Because a positioning method that is based on network-assisted positioning does not need to rely on measurement data uploaded by the terminal device, measurement data or a positioning result of the positioning method that is based on network-assisted positioning is reliable. In this embodiment of this application, when both the positioning method that is based on terminal device reporting and the positioning method that is based on network-assisted positioning can satisfy a requirement (for example, a reliability requirement and a QoS requirement), the positioning method that is based on network-assisted positioning may be preferentially selected. When the positioning method that is based on network-assisted positioning cannot satisfy a requirement, the positioning method that is based on terminal device reporting may be selected. In some other scenarios, for example, in a scenario in which a high reliability and a high QoS requirement (a low delay and/or high precision) are required, the positioning method that is based on terminal device reporting may be selected, and a positioning result (or coverage of a serving cell of a terminal device) obtained by using the positioning method that is based on network-assisted positioning may be used to verify a positioning result obtained by using the positioning method based on terminal device reporting.

According to a first aspect, an embodiment of this application provides a terminal device location determining method. The method includes: obtaining, by a location management function network element, location information reported by a terminal device and location information reported by a base station; determining location information of the terminal device based on the location information reported by the terminal device and the location information reported by the base station; and sending a positioning response to an application function entity or an external client by using a gateway mobile location center, where the positioning response includes the location information of the terminal device.

Optionally, in a possible implementation of the first aspect, the determining location information of the terminal device based on the location information reported by the terminal device and the location information reported by the base station includes: determining whether a difference between the location information reported by the terminal device and the location information reported by the base station is within an error range; and when the difference is within the error range, determining that the location information reported by the terminal device is the location information of the terminal device. When the difference is within the error range, the location information reported by the terminal device is proved to be reliable. The location information reported by the terminal device is used as the location information of the terminal device, and positioning accuracy and reliability are both considered.

Optionally, in a possible implementation of the first aspect, the determining location information of the terminal device based on the location information reported by the terminal device and the location information reported by the base station includes: determining whether a difference between the location information reported by the terminal device and the location information reported by the base station is within an error range; and when the difference is out of the error range, determining that the location information reported by the base station is the location information of the terminal device. When the difference is within the error range, the location information reported by the terminal device is proved to be unreliable. The location information reported by the base station is used as the location information of the terminal device, and positioning reliability can be ensured. According to the method, when the terminal device maliciously tampers with a positioning result or measurement data, for example, a terminal device located in Shanghai reports that the terminal device is currently located in a position in Beijing (which may be indicated by longitude and latitude), it is clear that the difference between the location information reported by the terminal device and the location information reported by the base station is out of the error range. Therefore, it can be identified that the terminal device falsely reports or tampers with the positioning result. The error range may be determined based on location precision reported by the terminal and location precision reported by the base station. A specific setting method is not limited in this application.

Optionally, in a possible implementation of the first aspect, the positioning response further includes an alarm indication, and the alarm indication is used to indicate that the terminal device reports false or tampered location information. The gateway mobile location center stores, locally or in a data management network element according to the alarm indication, a record of reporting the false or tampered location information by the terminal device, so that a factor that the terminal device may not be trusted needs to be considered when the location information of the terminal device is subsequently obtained again. For example, a positioning method that is based on UE reporting is not recommended.

Optionally, in a possible implementation of the first aspect, the method further includes: receiving indication information of a positioning method from the gateway mobile location center, where the indication information of the positioning method is used to determine a positioning method for obtaining the location information of the terminal device. The indication information of the positioning method is used to indicate a highly reliable positioning requirement or indicate a specific positioning method. The location management function network element may determine, based on the indication information of the positioning method, that a positioning method based on terminal device reporting and network-assisted positioning is used to obtain the location information of the terminal device. Specifically, the gateway mobile location center may determine a specific positioning method based on one or more of a type of a client, subscription data of the client, required QoS information, and whether target UE has historical behavior of false reporting, and notify the location management function network element by using the indication information of the positioning method. In another possible manner, the gateway mobile location center determines, based on one or more of a type of a client, subscription data of the client, required QoS information, and whether target UE has historical behavior of false reporting, that the client needs to request highly reliable positioning data, and notifies the location management function network element by using the indication information of the positioning method. The location management function network element determines a positioning method based on the type of the client, the subscription data of the client, the required QoS information, a positioning capability of the UE, a positioning capability of the base station, and the indication information of the positioning method. Particularly, when the location management function network element determines, based on the indication information of the positioning method, that the client needs to request the highly reliable positioning data, the positioning method that is based on network-assisted positioning is preferentially selected. When the positioning method that is based on network-assisted positioning cannot satisfy a requirement, the positioning method that is based on terminal device reporting may be selected. A positioning result (or coverage of a serving cell of the terminal device) obtained by using the positioning method that is based on network-assisted positioning may be used to verify a positioning result obtained by using the positioning method that is based on terminal device reporting.

According to a second aspect, an embodiment of this application provides a terminal device location determining method. The method includes: receiving, by a gateway mobile location center, a positioning request message from a client, where the positioning request message includes first indication information indicating that the client requests highly reliable positioning data; and sending a positioning data request message to a location management function network element, where the positioning data request message includes indication information of a positioning method, and the indication information of the positioning method is used to indicate a highly reliable positioning requirement or indicate a specific positioning method.

Optionally, in a possible implementation of the second aspect, a positioning response is received. The positioning response includes location information of a terminal device and an alarm indication, and the alarm indication is used to indicate that the terminal device reports false or tampered location information. Optionally, the gateway mobile location center stores, locally or in a data management network element according to the alarm indication, a record of reporting the false or tampered location information by the terminal device.

According to a third aspect, an embodiment of this application provides a device for obtaining location information of a terminal device. The device includes: a transceiver module, configured to obtain location information reported by a terminal device and location information reported by a base station; and a processing module, configured to determine location information of the terminal device based on the location information reported by the terminal device and the location information reported by the base station. The transceiver module is further configured to send a positioning response to an application function entity or an external client by using a gateway mobile location center, where the positioning response includes the location information of the terminal device.

Optionally, in a possible implementation, that the processing module is configured to determine the location information of the terminal device based on the location information reported by the terminal device and the location information reported by the base station is specifically: determining whether a difference between the location information reported by the terminal device and the location information reported by the base station is within an error range; and when the difference is within the error range, determining that the location information reported by the terminal device is the location information of the terminal device.

Optionally, in a possible implementation, that the processing module is configured to determine the location information of the terminal device based on the location information reported by the terminal device and the location information reported by the base station is specifically: determining whether a difference between the location information reported by the terminal device and the location information reported by the base station is within an error range; and when the difference is out of the error range, determining that the location information reported by the base station is the location information of the terminal device.

Optionally, in a possible implementation, the positioning response further includes an alarm indication, and the alarm indication is used to indicate that the terminal device reports false or tampered location information.

In a possible implementation, the transceiver module is further configured to receive indication information of a positioning method from the gateway mobile location center, where the indication information of the positioning method is used to determine a positioning method for obtaining the location information of the terminal device. The indication information of the positioning method is used to indicate a highly reliable positioning requirement or indicate a specific positioning method.

In a possible implementation, the processing module is further configured to determine, based on the indication information of the positioning method, a positioning method that is based on terminal device reporting and network-assisted positioning.

In a possible implementation, the location information reported by the base station is information about a serving cell of the terminal device.

In a possible implementation, that the processing module is configured to determine the location information of the terminal device based on the location information reported by the terminal device and the location information reported by the base station is specifically: determining whether a difference between the location information reported by the terminal device and coverage of the serving cell of the terminal device is within an error range; and when the difference is within the error range, determining that the location information reported by the terminal device is the location information of the terminal device.

In a possible implementation, that the processing module is configured to determine the location information of the terminal device based on the location information reported by the terminal device and the location information reported by the base station is specifically: determining whether a difference between the location information reported by the terminal device and coverage of the serving cell of the terminal device is within an error range; and when the difference is out of the error range, re-obtaining the location information of the terminal device by using a positioning method that is based on network-assisted positioning.

The device in the third aspect corresponds to the method in the first aspect, and related beneficial effects are not described again.

According to a fourth aspect, an embodiment of this application provides a device for obtaining location information of a terminal device. The device includes a transceiver module, configured to: receive a positioning request message from a client, where the positioning request message includes first indication information indicating that the client requests highly reliable positioning data; and send a positioning data request message to a location management function network element, where the positioning data request message includes indication information of a positioning method, and the indication information of the positioning method is used to indicate a highly reliable positioning requirement or indicate a specific positioning method.

Optionally, in a possible implementation, the transceiver module is further configured to receive a positioning response. The positioning response includes location information of a terminal device and an alarm indication, and the alarm indication is used to indicate that the terminal device reports false or tampered location information.

Optionally, in a possible implementation, the device further includes a processing module, configured to store, locally or in a data management network element according to the alarm indication, a record of reporting the false or tampered location information by the terminal device.

According to a fifth aspect, a system for obtaining location information of a terminal device is provided. The system includes a location management function network element and a gateway mobile location center. The gateway mobile location center is configured to: after receiving a positioning request message that is for a terminal device and that is sent by a client, send a positioning data request message to the location management function network element, where the positioning data request message includes indication information of a positioning method. The location management function network element is configured to: determine a positioning method based on the indication information of the positioning method included in the positioning data request message; determine location information of the terminal device by using the positioning method; and send a positioning response to the client by using the gateway mobile location center, where the positioning response includes the location information of the terminal device.

In a possible implementation, the positioning request message includes first indication information indicating that the client requests highly reliable positioning data. The gateway mobile location center is further configured to: determine whether the client is a client that subscribes to a service and/or determine whether the terminal device has historical behavior of false reporting, and generate the indication information of the positioning method based on a determining result.

In a possible implementation, the indication information of the positioning method is used to indicate a highly reliable positioning requirement or indicate a specific positioning method.

In a possible implementation, that the location management function network element is configured to determine the positioning method is specifically: determining, based on the indication information of the positioning method, a positioning method that is based on terminal device reporting and network-assisted positioning. That the location management function network element is configured to determine the location information of the terminal device by using the positioning method is specifically: obtaining location information reported by the terminal device and location information reported by a base station; and determining the location information of the terminal device based on the location information reported by the terminal device and the location information reported by the base station.

In a possible implementation, that the location management function network element is configured to determine the location information of the terminal device based on the location information reported by the terminal device and the location information reported by the base station is specifically: determining whether a difference between the location information reported by the terminal device and the location information reported by the base station is within an error range; and when the difference is within the error range, determining that the location information reported by the terminal device is the location information of the terminal device.

In a possible implementation, that the location management function network element is configured to determine the location information of the terminal device based on the location information reported by the terminal device and the location information reported by the base station is specifically: determining whether a difference between the location information reported by the terminal device and the location information reported by the base station is within an error range; and when the difference is out of the error range, determining that the location information reported by the base station is the location information of the terminal device.

In a possible implementation, the positioning response further includes an alarm indication, and the alarm indication is used to indicate that the terminal device reports false or tampered location information.

In a possible implementation, the gateway mobile location center is further configured to record, locally or in a data management network element according to the alarm indication, behavior of reporting the false or tampered location information by the terminal device.

In a possible implementation, the location information reported by the base station is information about a serving cell of the terminal device.

In a possible implementation, that the location management function network element is configured to determine the location information of the terminal device based on the location information reported by the terminal device and the location information reported by the base station is specifically: determining whether a difference between the location information reported by the terminal device and coverage of the serving cell of the terminal device is within an error range; and when the difference is within the error range, determining that the location information reported by the terminal device is the location information of the terminal device.

In a possible implementation, that the location management function network element is configured to determine the location information of the terminal device based on the location information reported by the terminal device and the location information reported by the base station is specifically: determining whether a difference between the location information reported by the terminal device and coverage of the serving cell of the terminal device is within an error range; and when the difference is out of the error range, re-obtaining the location information of the terminal device by using the positioning method that is based on network-assisted positioning.

According to a sixth aspect, an embodiment of this application provides an apparatus. The apparatus includes a memory and a processor coupled to the memory, where the memory is configured to store a program, and the processor is configured to execute the program stored in the memory; and when the processor runs the program, the apparatus is enabled to perform the method according to the first aspect or the second aspect.

According to a seventh aspect, an embodiment of this application provides a storage medium. The storage medium includes a readable storage medium and a computer program, where the computer program is used to implement the terminal device location determining method according to any possible implementation of any aspect.

According to an eighth aspect, an embodiment of this application provides a computer program product. The computer program product includes computer instructions. When the computer instructions are executed by a communication apparatus, the communication apparatus is enabled to perform the terminal device location determining method according to any possible implementation of any aspect.

BRIEF DESCRIPTION OF DRAWINGS

FIG. 3A to FIG. 3C are message exchange diagrams of a terminal device location determining method according to an embodiment of this application;

DESCRIPTION OF EMBODIMENTS

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically the same functions or purposes. A person skilled in the art may understand that the terms, such as "first" and "second", are not intended to limit a quantity or an execution sequence; and the terms, such as "first" and "second", do not indicate a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of a new service scenario, the technical solutions provided in the embodiments of this application are also applicable to similar technical problems.

Figure 1:
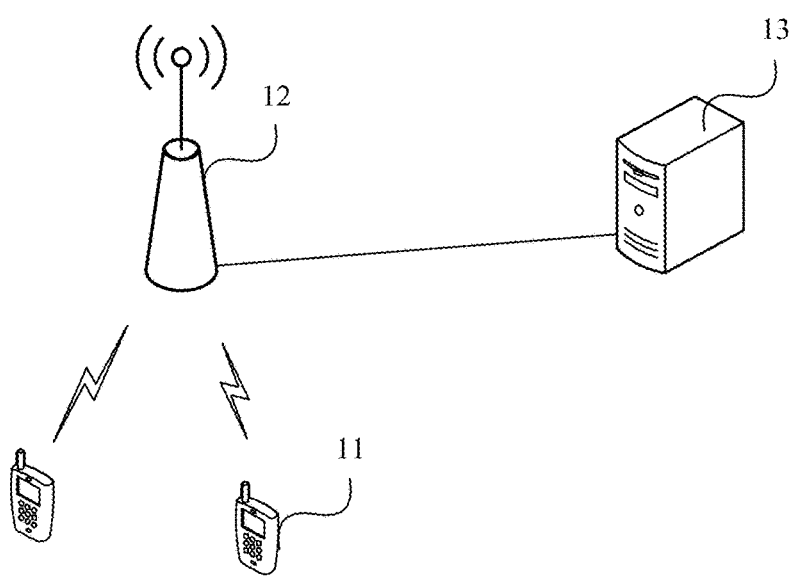
FIG. 1 is a diagram of a network architecture of a communication system to which an embodiment of this application is applicable.

A terminal device location determining method and a device that are provided in the embodiments of this application can be applied to a long term evolution (long term evolution, LTE) communication system and its subsequent evolved communication system, a future 5G communication system, and another communication system. For example, FIG. 1 is a diagram of a network architecture of a communication system to which an embodiment of this application is applicable. As shown in FIG. 1, the communication system may include a terminal device 11, a base station 12, and a core network device 13. The terminal device 11 may perform uplink and downlink communication with the base station 12. The terminal device 11 may perform uplink and downlink communication with the core network device 13 by using the base station 12.

The terminal device 11 in the embodiments of this application is a device that has a wireless connection function, for example, a mobile phone, a tablet computer, a handheld device, a vehicle-mounted device, a wearable device, a computing device, and various forms of mobile stations (mobile station, MS) and terminal devices (terminal). This is not limited in the embodiments of this application.

The base station 12 in the embodiments of this application may be any device that has a wireless network resource management function, or various wireless access points. For example, the base station 12 is an evolved NodeB (evolutional node B, eNB or eNodeB), a relay node, or an access point in an LTE communication system, or a 5G NodeB (g node B, gNB) or a wireless transceiver device (next node, NX) in a future 5G communication system. This is not limited in the embodiments of this application.

The core network device 13 in the embodiments of this application may include, for example, a mobility management entity (Mobility Management Entity, MME), a home subscriber server (home subscriber server, HSS), and an evolved serving mobile location center (Evolved Serving Mobile Location Center, E-SMLC) that are used in a 4G network. For another example, the core network device 13 may include an access and mobility management function (Access and Mobility Management Function, AMF), an authentication server function (Authentication Server Function, AUSF), unified data management (Unified Data Management, UDM), a location management function (Location Management Function, LMF), a gateway mobile location center (Gateway Mobile Location Center, GMLC) that are used in a 5G network. This is not limited in the embodiments of this application. The MME and the AMF may also be referred to as mobility management devices, and the E-SMLC, the LMF and the GMLC may also be referred to as location management network elements or location management devices. The HSS and the UDM may be referred to as data management network elements or data management devices.

Figure 2:
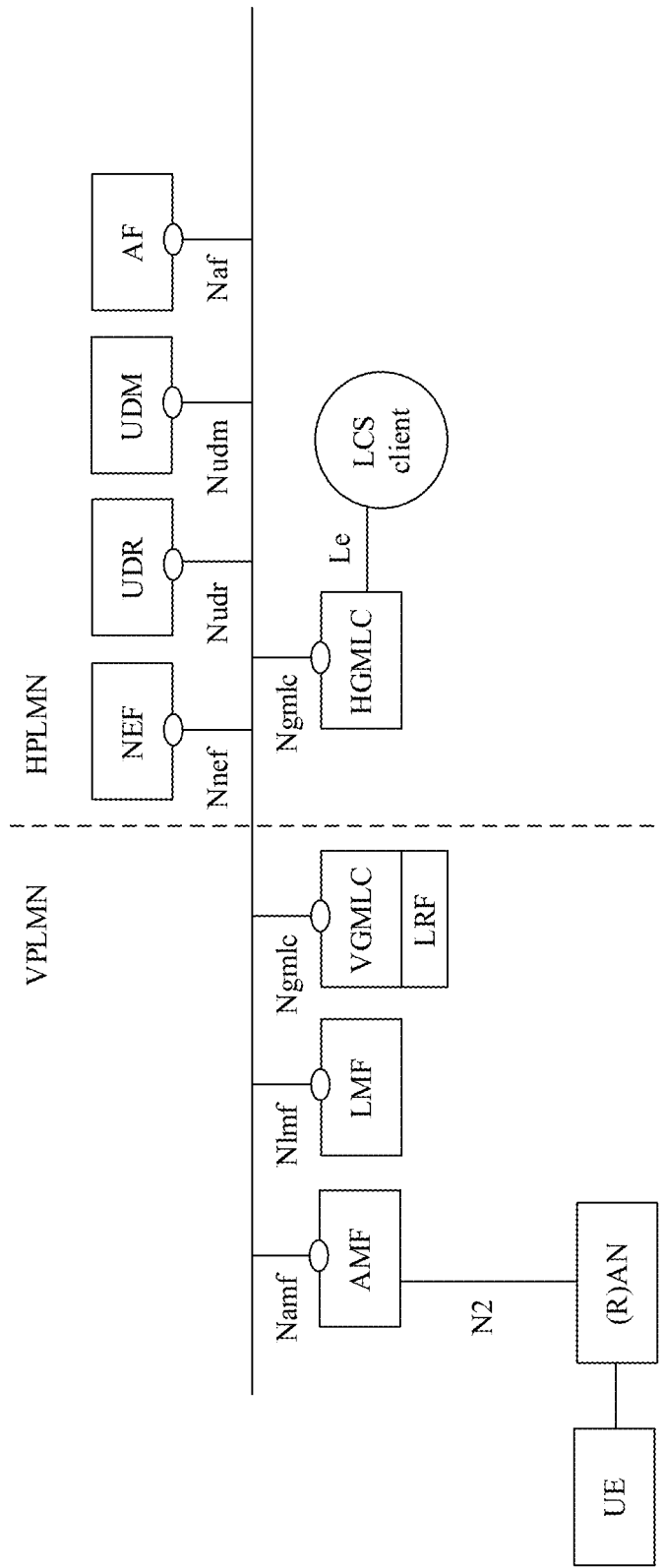
FIG. 2 is another schematic diagram of a network architecture to which an embodiment of this application is applicable.

FIG. 2 is a schematic diagram of a network architecture of a 5G system. The network architecture includes UE, an access network (access network, AN) device, and a core network element.

The access network device may be a RAN device, and participates in processing different positioning procedures, including performing location measurement on target UE, providing location-related auxiliary information (for example, UE-assisted cell information), and transferring a positioning message between the UE, an AMF, and an LMF.

The core network element may include the following network elements: an AMF (Access and Mobility Management Function, AMF) network element, a location management function (location management function, LMF) network element, a gateway mobile location center (Gateway Mobile Location Center, GMLC) network element, a network exposure function (network exposure function, NEF) network element, a network repository function (network repository function, NRF) network element, a unified data management (unified data management, UDM) network element, and an application function (application, AF) network element.

The AMF network element is a termination point of non-access stratum (Non-access stratum, NAS) signaling, and is mainly responsible for user access and mobility management.

The LMF network element is configured to: receive a positioning request, determine a positioning manner based on a capability of UE and a network, a QoS requirement, and a type of a client, exchange positioning-related information with the UE, a base station, and the like, and calculate and verify a positioning result, and the like.

The NEF network element is used to support capability and event exposure, and provide functions such as information and internal and external information translation for external application security.

The NRF network element is configured to allow each network function to discover another network function and provide a service for the discovery.

The UDM network element is configured to support functions such as 3rd generation partnership project (3rd-generation partnership project, 3GPP) authentication, user identity operation, permission grant, registration and mobility management, and storage of subscription data.

The AF network element is a functional network element that provides various business services, provides a framework, authentication, and an interface that are related to network capability exposure, and transmits information between a 5G system network function and another network function. In this application, the AF network element may obtain a positioning service in a gateway mobility location in a same trusted domain (for example, a same PLMN).

A positioning service client is a third-party client that requests to obtain a location of a user. A type of the positioning service client includes an emergency service client (for example, a lawful interception department) and a commercial service client (for example, a map service provider).

The GMLC network element is the first network element used by external location application to access a core network, and requests routing information and privacy setting information of UE from the UDM. The GMLC network element performs registration authentication and privacy verification for the UE, and forwards a positioning request to a service access management function. The GMLC network element may be an independent network function (network function) network element, or may be included in the NEF network element. This is not limited in this application.

In the schematic diagram of the network architecture shown in FIG. 2, an interface between network elements is further included. For example, N2 indicates an interface between the AMF network element and the RAN device. An interface between a network element and a communication bus is further included. For example, Namf indicates an interface between the AMF network element and the communication bus. For details, refer to the accompanying drawings. Details are not described herein again.

The following describes related concepts in the embodiments of this application.

There are three methods for measuring a location of UE.
1. UE-based positioning method (UE based positioning method);
   UE performs data measurement, and then the UE performs calculation based on measured data to determine a location of the UE, for example, to determine longitude and latitude information of the UE.
2. UE-assisted positioning method (UE assisted positioning method);
   UE performs data measurement, and then the UE sends measured data to a network side, and a network element (for example, an LMF) on the network side performs calculation to determine a location of the UE, for example, to determine longitude and latitude information of the UE.
3. Network-assisted positioning method (network assisted positioning method);
   a base station performs data measurement, and then the base station sends measured data to a network side, and a network element (for example, an LMF) on the network side performs calculation to determine a location of the UE, for example, to determine longitude and latitude information of the UE.

In this embodiment of this application, location information reported by a terminal device is obtained by using the UE-based positioning method or the UE-assisted positioning method. Location information reported by a base station is obtained by using the network-assisted positioning method or is obtained by using a location of a serving cell of the terminal device.

Because the network-assisted positioning method does not rely on information reported by the UE, a calculated and determined location (that is, a positioning result) of the UE is reliable. For the UE-based positioning method or the UE-assisted positioning method, if the UE reports a false positioning result or measurement data, an external client/application function/network function may obtain a false location of the UE. In the following descriptions, the UE-based positioning method and the UE-assisted positioning method are collectively referred to as a positioning method that is based on UE reporting. The positioning result or measurement data reported by the UE is collectively referred to as the location information reported by the UE.

For a positioning service that requires high reliability, the network-assisted positioning method is preferred. If the network-assisted positioning method cannot satisfy a service quality requirement, an LMF may select the UE-based positioning method or the UE-assisted positioning method. Considering that the UE may report the false positioning result or measurement data, the positioning result of the network-assisted positioning method may be used for verification. If the network-assisted positioning method cannot be used, for example, a necessary parameter cannot be obtained, a location of an attached cell of the UE, for example, tracking area identity (tracking area identity, TAI) information or a physical cell identifier (physical cell ID, PCI) may be used for further verification.

To resolve a technical problem that positioning data may be tampered by using the UE-based positioning method and the UE-assisted positioning method in a current technology, a terminal device location determining method and a device are provided in the embodiments of this application. In this way, measurement data reported by the UE or a location of the UE can be verified, to confirm whether a location of a user is abnormal in a timely manner.

The following uses specific embodiments to describe in detail technical solutions of this application and how the technical solutions of this application resolve the foregoing technical problem. The following several specific embodiments may be combined with each other, and a same or similar concept or process may not be described repeatedly in some embodiments.

FIG. 3A to FIG. 3C are message exchange diagrams of a terminal device location determining method according to Embodiment 1 of this application. The terminal device location determining method provided in this embodiment can be applied to a 4G communication network, a 5G communication network, or another communication network. Detecting false positioning data and preventing UE from reporting false positioning data can provide more reliable positioning services for customers. In this embodiment, a GMLC selects a positioning method based on information such as whether a client subscribes to a service, and this embodiment describes a processing method used when positioning results of a plurality of types of positioning methods are inconsistent.

As shown in FIG. 3A to FIG. 3C, the terminal device location determining method provided in this embodiment may include the following steps.

S301: An AF or an external positioning client sends a positioning service request to an HGMLC.

The positioning service request includes attribute information such as required QoS information and a type of the external positioning client (which is referred to as a client hereinafter). The external client can also be replaced with the AF. The AF accesses the HGMLC through an NEF interface. The HGMLC is responsible for positioning authorization of the external client or the AF. The QoS information includes performance requirements such as positioning precision and response time that are required for positioning this time.

In this embodiment of this application, an apparatus, for example, the AF or the external positioning client, configured to request location information of a terminal device is collectively referred to as a client.

Optionally, the positioning service request may further carry first indication information, and the first indication information indicates that highly reliable positioning data is required. In a possible implementation, the HGMLC is triggered to request subscription data of the client from UDM in step 302 below only when the HGMLC receives the first indication information. When the HGMLC does not receive the first indication information, step 302 is skipped. Certainly, step 302 may not be necessarily performed. This is not limited in this application.

S302: The HGMLC requests the subscription data of the client and positioning-related information of target UE from the UDM.

The subscription data of the client is used to indicate whether the client is a subscriber, for example, whether the client is a subscriber of a highly reliable positioning service, and whether the client is allowed to initiate a positioning service (obtaining a location of the UE). The positioning-related information of the target UE includes privacy setting data of the target UE and/or whether the target UE has historical behavior of false reporting. The privacy setting data of the target UE, namely, data that is set by a user on the UE and that indicates whether positioning is allowed, may include, for example, the following: (1) not allowing positioning; (2) requiring to notify the user and being authorized by the user whether to allow positioning, where there are two cases: One is that positioning is performed only when the user authorizes to allow positioning, and the other is that positioning is performed when the user authorizes to allow positioning or when the user does not respond; (3) allowing positioning but requiring to notify the user; and (4) allowing positioning but not requiring to notify the user. If the target UE has the historical behavior of false reporting, it indicates that the UE has low reliability.

In a possible implementation, when the target UE sets that the positioning is not allowed, the procedure ends.

S303: The HGMLC determines a positioning method, and transmits a positioning service request to a VGMLC, where the positioning service request includes an indication information of the positioning method; optionally, the positioning service request includes attribute information such as a type of the client and the required QoS information.

Optionally, the positioning service request further includes a behavior indication determined based on the privacy setting data of the target UE, and the behavior indication is used to indicate the privacy setting data of the target UE. For example, authorization of the UE needs to be obtained before the positioning is performed. For details, refer to a related procedure in a current technology. Details are not described herein again.

Specifically, the HGMLC may determine the positioning method based on one or more of the first indication information, the type of the client, the subscription data of the client, the required QoS information, and whether the target UE has the historical behavior of false reporting. The positioning method includes: (1) A redundant positioning method that is based on UE reporting and network-assisted positioning is used, that is, a positioning method that is based on UE reporting and a positioning method that is based on network-assisted positioning are both used, and then a final positioning result (the location of the UE) is determined according to a preset policy; (2) the positioning method that is based on network-assisted positioning is used; (3) the positioning method that is based on UE reporting is used.

In a possible implementation, when the type of the client is a commercial service and the client is a subscriber, it is determined that the redundant positioning method that is based on UE reporting and network-assisted positioning is preferentially used.

In a possible implementation, when the type of the client is a commercial service, the client is a subscriber, and the QoS requirement is delay-insensitive, it is determined that the redundant positioning method that is based on UE reporting and network-assisted positioning is preferentially used.

In a possible implementation, when the type of the client is a commercial service, the client is a subscriber, the QoS requirement is delay-sensitive, and a precision requirement is not high, it is determined that the positioning method that is based on network-assisted positioning is preferentially used.

In a possible implementation, when the type of the client is a commercial service and the client is not a subscriber, the indication information of the positioning method is not sent.

In a possible implementation, when the type of the client is an emergency service and the QoS requirement is delay-insensitive, it is determined that the redundant positioning method that is based on UE reporting and network-assisted positioning is preferentially used.

In a possible implementation, when the type of the client is an emergency service and the QoS requirement is delay-sensitive, it is determined that the positioning method that is based on network-assisted positioning is preferentially used.

In a possible implementation, when the target terminal device has the historical behavior of false reporting, the QoS requirement is delay-sensitive, and the precision requirement is not high, it is determined that the positioning method that is based on network-assisted positioning is preferentially used.

In a possible implementation, when the target terminal has the historical behavior of false reporting, and the QoS requirement is delay-insensitive, the redundant positioning method that is based on UE reporting and network-assisted positioning is determined.

The indication information of the positioning method may be, for example, indication information that can reflect a positioning requirement of the client. For example, the indication information may be the same as the first indication information, and is used to indicate that the client needs highly reliable positioning data. The indication information may alternatively be indication information indicating a specific positioning method. For example, a GMLC may encode a determined positioning method. For example, when the indication information of the positioning method is a first value (for example, "01"), the positioning method that is based on UE reporting is used. When the indication information of the positioning method is a second value (for example, "10"), the positioning method that is based on network-assisted positioning is used. When the indication information of the positioning method is a third value (for example, "11"), the redundant positioning method that is based on UE reporting and network-assisted positioning is used.

S304: The VGMLC receives the positioning service request of the HGMLC, and the VGMLC sends a positioning data request message to an AMF. The AMF receives the positioning data request message sent by the VGMLC.

Optionally, in a non-roaming scenario, step 303 and step 304 may be combined, that is, the HGMLC may directly send the positioning data request message to the AMF. In a roaming scenario, the HGMLC receives the positioning service request sent to the VGMLC. The positioning service request and the positioning data request message include the attribute information in step 301 such as the required QoS information and the type of the LCS client, the behavior indication determined based on the privacy setting data of the UE, and the indication information of the positioning method determined in step 303.

In another possible implementation, when the indication information of the positioning method determined in step 303 indicates indication information of a specific positioning method, the positioning data request message may not include the attribute information in step 301 such as the required QoS information and the type of the LCS client.

S305: Optionally, if the UE is in a non-connected state such as an idle state or an inactive state, the AMF triggers a service request procedure of a network side to the UE, to establish a signaling connection between the UE and the network side.

For details, refer to the current technology. Details are not described herein.

S306 and S307: Optionally, notify or request, according to the behavior indication, the UE to authorize the positioning service.

In a possible implementation, if in this step, the behavior indication indicates that the positioning is performed only when the user authorizes to allow positioning, the procedure may be terminated if the UE refuses to provide the positioning service.

S308: The AMF selects an LMF based on local configuration or other information.

For a method for selecting the LMF by the AMF, refer to the current technology. Details are not described herein again.

S309: The AMF sends a positioning request message to the LMF, where the positioning request message includes the indication information of the positioning method.

Optionally, the positioning request message further includes an identifier of a serving cell of the target UE, the required QoS information and the type of the client in step 301, and the like.

S310: The LMF determines the positioning method.

The LMF selects a corresponding positioning method based on the indication information of the positioning method. When the indication information of the positioning method may be, for example, indication information that can reflect a positioning requirement of the client, for example, when the indication information may be the same as the first indication information, and is used to indicate that the client needs highly reliable positioning data, the LMF may select, according to a policy, a positioning method that satisfies the requirement. For example, the LMF may determine the positioning method based on the indication information of the positioning method, the required QoS information, the type of the client, a positioning capability of the UE, a positioning capability of a base station, and the like. If the positioning method that satisfies the requirements cannot be obtained, a rejection response is initiated.

A policy of the LMF may be preferentially using the network-assisted positioning method in a high-reliability scenario. In some scenarios, when the positioning method that is based on network-assisted positioning cannot satisfy the required QoS information (QoS requirement), a UE-based positioning method or a UE-assisted positioning method may be used. In some scenarios in which a reliability requirement is high and the positioning method that is based on network-assisted positioning cannot satisfy the required QoS information (QoS requirement), the redundant positioning method that is based on UE reporting and network-assisted positioning may be used, and another network-assisted positioning method may be used to verify a positioning result reported by the UE. If the network-assisted positioning method cannot be used, for example, the base station cannot obtain some positioning-related parameters, a location (or coverage) of an attached/serving cell of the UE may be used for further verification.

When the indication information of the positioning method is indication information indicating a specific positioning method, the positioning method may be determined based on the indication information of the positioning method. If the positioning method indicated by the indication information of the positioning method cannot be used, the rejection response may be initiated, or the positioning method that satisfies the requirement may be selected according to a local policy. For example, the LMF may re-determine the positioning method based on the required QoS information, the type of the client, the positioning capability of the UE, the positioning capability of the base station, and the like. A used positioning method is reported in steps S313 to S316.

In the following steps in this embodiment, the redundant positioning method that is based on UE reporting and network-assisted positioning is used as an example.

S311*a*: Initiate a measurement procedure that is based on UE reporting.

S311*b*: Initiate a positioning procedure that is based on network-assisted positioning.

S312: The LMF obtains a UE-based positioning result (location A) and a network-based positioning result (location B) by using S311*a* and S311*b* respectively. Location information of the target UE is determined according to a preset policy.

The network-based positioning result is more reliable. If a difference between the UE-based positioning result and the network-based positioning result is within an error range, it is determined that the UE-based positioning result is also reliable. The location information of the target UE determined according to the preset policy is reported to the GMLC.

In a possible implementation, when the difference between the UE-based positioning result and the network-based positioning result is within a preset error range, the UE-based positioning result is used as the location information of the target UE, and is sent to the client or the AF by using another network element.

In a possible implementation, when the difference between the UE-based positioning result and the network-based positioning result is within the preset error range, the location information of the target UE is determined based on the UE-based positioning result and the network-based positioning result according to a preset rule, and is sent to the client or the AF by using another network element. For example, the UE-based positioning result and the network-based positioning result may be weighted averaged to determine final location information.

In another possible implementation, when the difference between the UE-based positioning result and the network-based positioning result is out of the preset error range, the network-based positioning result is used as the location information of the target UE, and is sent to the client or the AF by using another network element. Optionally, the LMF further sends an alarm indication to the GMLC and the client or the AF, where the alarm indication is used to indicate that the target UE may report false or tampered location information.

S313 to S316: The LMF sends positioning response information to the client or the AF by using a core network element, where the positioning response information includes the location information of the target UE.

Optionally, when the difference between the UE-based positioning result and the network-based positioning result is out of the preset error range, the request response information further includes the alarm indication.

S317 to S319: Optionally, the GMLC sends a subscription data update request to the UDM according to the alarm indication, and records, in the UDM, behavior of reporting the false or tampered location information by the target UE. Optionally, the GMLC may store, locally according to the alarm indication, behavior record of reporting the false or tampered location information by the terminal device.

In the solutions in this embodiment of this application, the GMLC determines the positioning method, and sends the indication information of the positioning method to the LMF. When the LMF performs the redundant positioning method based on UE and a network, a method for determining whether the positioning result reported by the UE is reliable is provided. If the positioning result reported by the UE is unreliable, the LMF triggers an alarm to the client. When the redundant positioning method based on UE and a network is used, it can be ensured that the client obtains reliable positioning data. When the UE performs false reporting, the client is alarmed and the historical behavior of the UE is stored. According to the method in this embodiment of this application, a more reliable and accurate positioning service can be provided for the client.

Figure 4A:
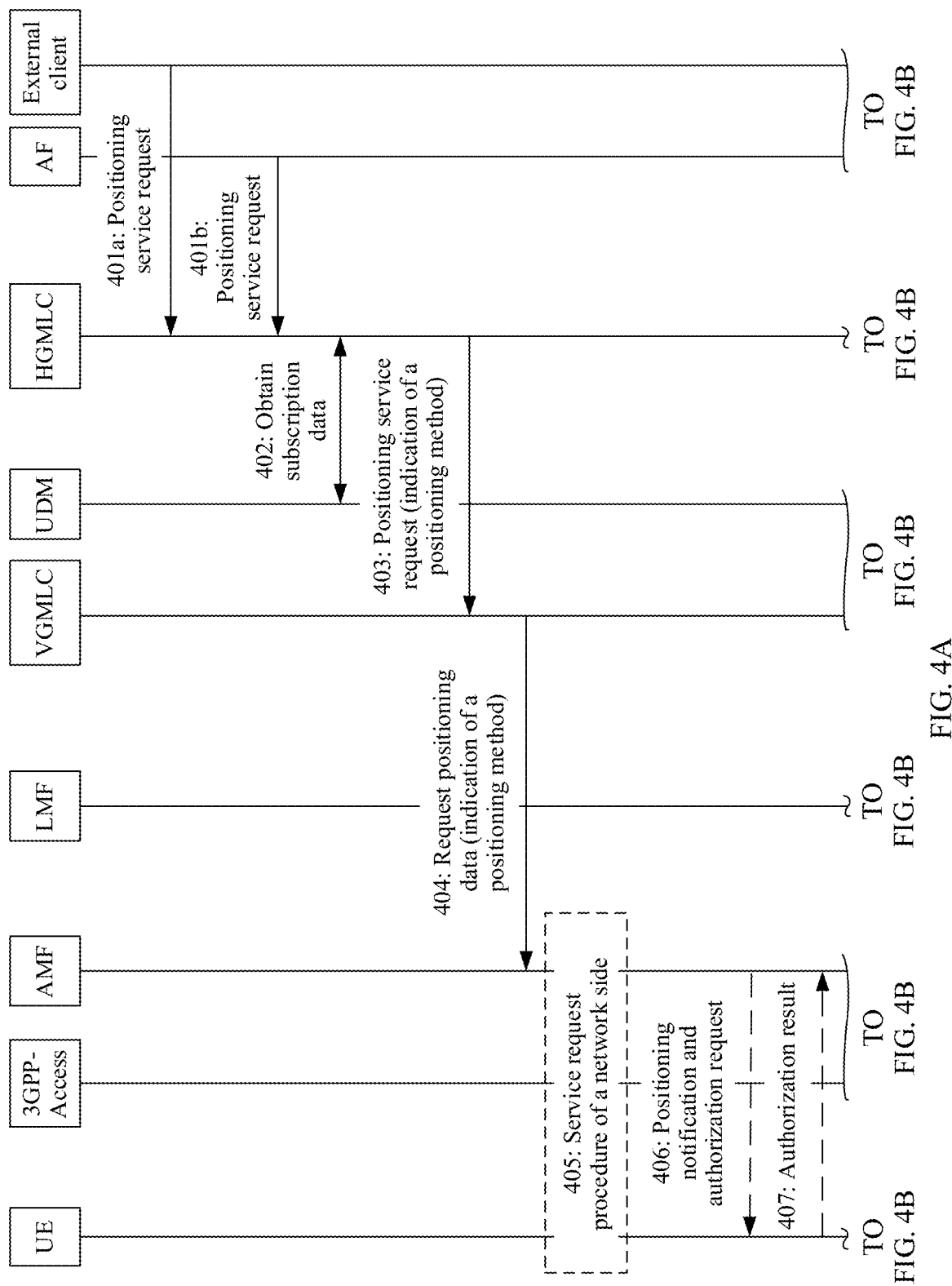
FIG. 4A and FIG. 4B are message exchange diagrams of a terminal device location determining method according to an embodiment of this application.
Figure 4B:
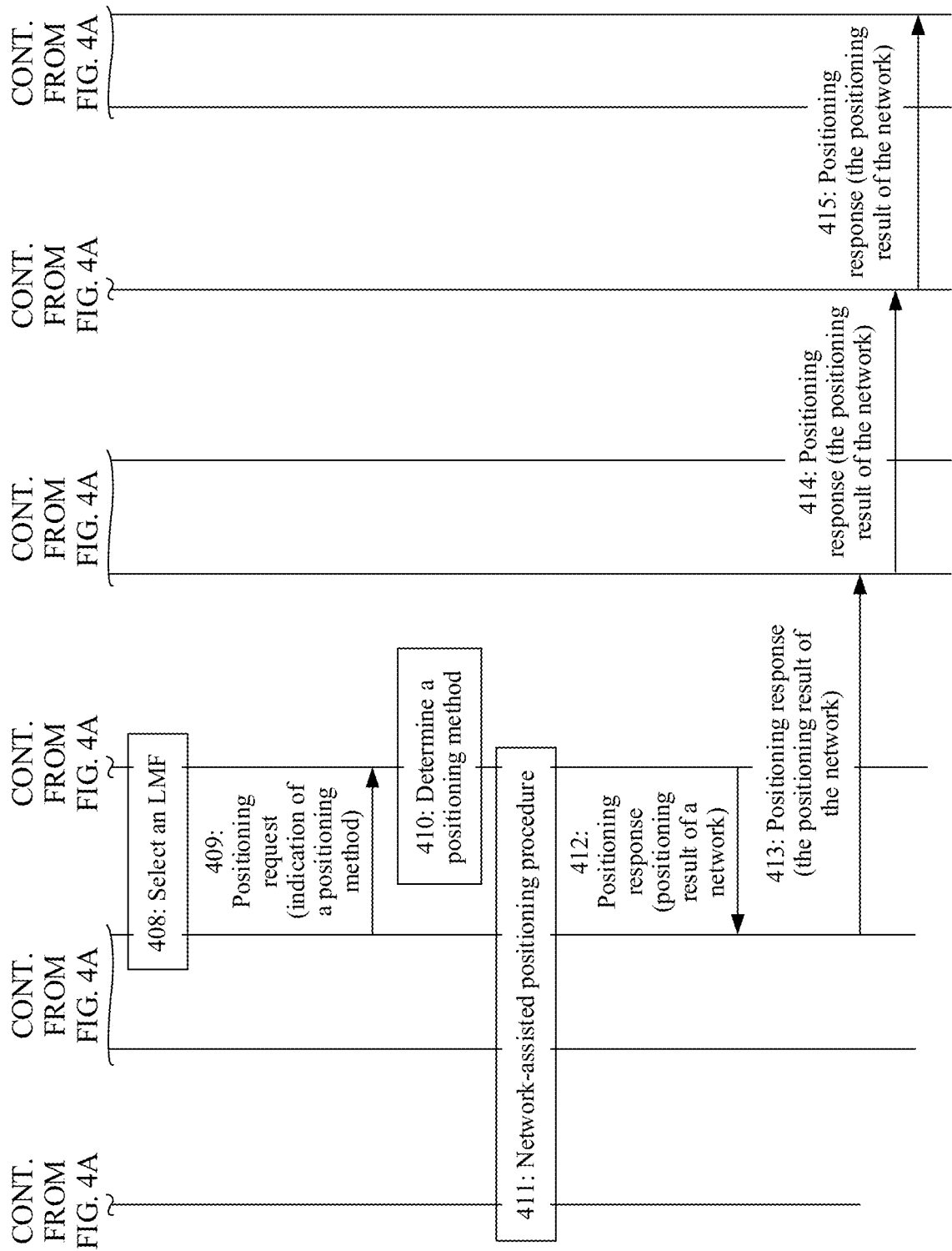

FIG. 4A and FIG. 4B are message exchange diagrams of a terminal device location determining method according to Embodiment 1 of this application. The terminal device location determining method provided in this embodiment can be applied to a 4G communication network, a 5G communication network, or another communication network. Step 401*a* to step 410 in this embodiment of this application may be the same as step 301*a* to step 310 in the embodiment of FIG. 3A and FIG. 3B. To be specific, an HGMLC determines indication information of a positioning method, sends the indication information to an LMF, and then the LMF determines a positioning method based on the indication information of the positioning method. Step 401*a* to step 410 may also be the same as that in a current technology. To be specific, the LMF receives, by using a core network element, a type of a client and required QoS information that are from a client or an AF, and further determines the positioning method based on a positioning capability of UE (whether to support/authorize/allow a measurement method that is based on UE reporting) and a positioning capability of a base station. In this embodiment, the positioning method determined by the LMF is a positioning method that is based on network-assisted positioning. Because the positioning method that is based on network-assisted positioning is reliable, the LMF may send determined location information of the UE to the client or the AF by using the core network element.

In a possible implementation, step 311b in the embodiment of FIG. 3B may be simplified as that the LMF obtains information about a serving cell of target UE. Then, in step 312, the LMF obtains a UE-based positioning result (location A) and the information about the serving cell of the target UE (location B) by using S311a and S311b respectively, and determines the location information of the target UE according to a preset policy.

For example, the LMF may compare a positioning result reported by a UE side with coverage of the serving cell of the UE. If the positioning result reported by the UE is within the coverage of the cell in which the UE is located, the positioning result reported by the UE is considered reliable, and the positioning result reported by the UE is used as the location information of the target UE. If the positioning result reported by the UE is not within the coverage of the cell in which the UE is located, the positioning result reported by the UE is considered unreliable. In this case, the LMF may use the positioning method that is based on network-assisted positioning to perform positioning calculation again, and use a network-based positioning result as the location information of the target UE. The coverage of the serving cell of the UE may be obtained by querying a physical cell identifier (Physical Cell ID, PCI), a tracking area code (Tracking Area Code, TAC), or the like.

Optionally, the LMF may alternatively deliver the positioning result reported by the UE to an AMF, and the AMF compares the positioning result reported by the UE with the coverage of the serving cell of the UE. If the positioning result reported by the UE is out of the coverage of the serving cell, the AMF notifies the LMF to perform positioning calculation again by using the positioning method that is based on network-assisted positioning. Subsequently, refer to related descriptions in steps 313 to 319 in the embodiment of FIG. 3C.

The following describes core network devices provided in the embodiments of this application. The devices are in a one-to-one correspondence with the foregoing methods, are configured to implement the terminal device location determining methods provided in the foregoing method embodiments, and have a same technical feature and a same technical effect. Details are not described in the embodiments of this application.

Figure 5:
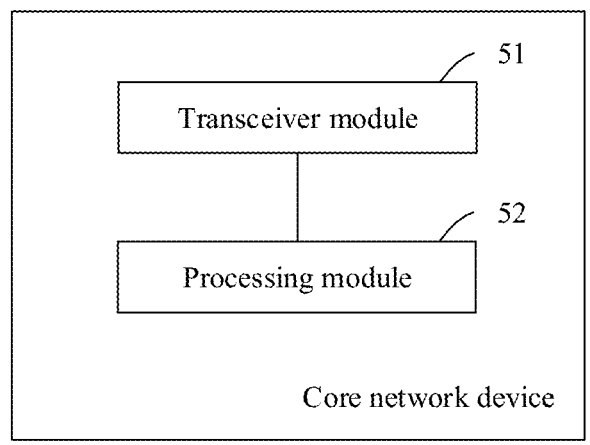
FIG. 5 is a schematic structural diagram of a core network device according to an embodiment of this application.

FIG. 5 is a schematic structural diagram of a core network device according to an embodiment of this application. As shown in FIG. 5, the core network device may include a transceiver module 51 and a processing module 52. The processing module 52 is configured to control, manage, and perform an action of the core network device. The transceiver module 51 is configured to support communication between the core network device and another device. The core network device may further include a storage module, configured to store program code and data of a terminal device.

The core network device may include any one of the following: an AMF, a GMLC (an HGMLC and a VGMLC), UDM, and an LMF.

Figure 6:
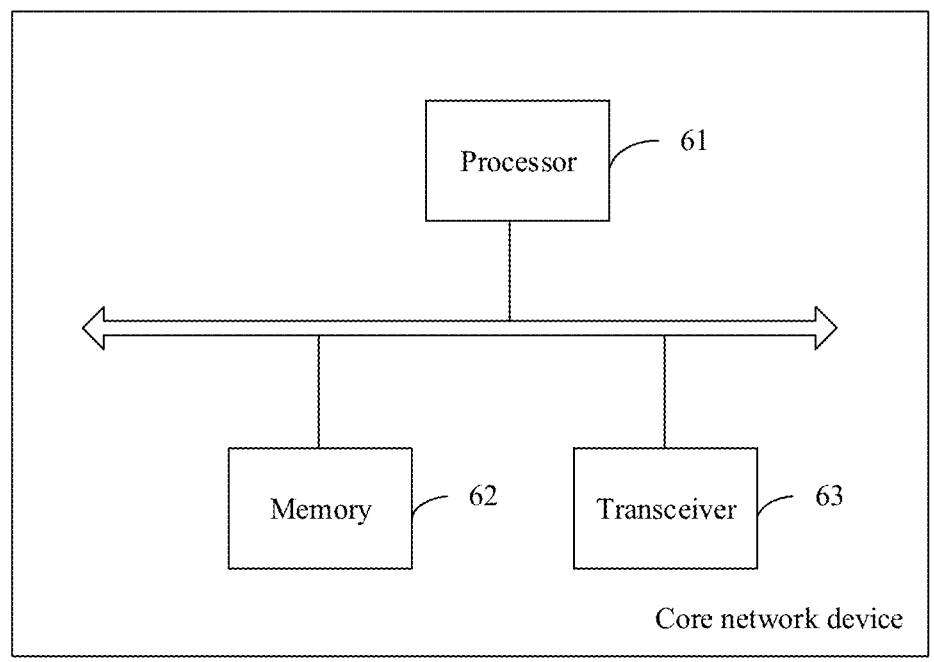
FIG. 6 is another schematic structural diagram of a core network device according to an embodiment of this application.

FIG. 6 is another schematic structural diagram of a core network device according to an embodiment of this application. As shown in FIG. 6, the core network device may include a processor 61, a memory 62, and a transceiver 63. The transceiver 63 is configured to communicate with another device, and the processor 61 is configured to execute instructions stored in the memory 62, to enable the core network device to perform an operation performed by the core network device in the foregoing method embodiments.

The core network device may include any one of the following: an AMF, a GMLC (an HGMLC and a VGMLC), UDM, and an LMF.

It can be understood that the processor in the embodiments of this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

What is claimed is:

1. A method, comprising:
   receiving, from a gateway mobile location center, an indication of requiring reliable location information of a terminal device;
   determining, in response to the received indication of requiring reliable location information of the terminal device, a network-assisted positioning method;
   determining location information of the terminal device using the network-assisted positioning method; and
   sending a positioning response through the gateway mobile location center, wherein the positioning response comprises the location information of the terminal device.

2. The method according claim 1, wherein the method is performed by a location management function network element.

3. The method according claim 2, further comprising:
receiving, by the gateway mobile location center, a positioning request message for the terminal device, wherein the positioning request message comprises a first indication information indicating that a client requests highly reliable positioning data; and
sending, by the gateway mobile location center, a positioning data request message to the location management function network element, wherein the positioning data request message comprises the indication of requiring reliable location information of the terminal device.

4. The method according claim 3, further comprising:
sending, by the client, the positioning request message to the gateway mobile location center; and
receiving, by the client, the positioning response.

5. The method according claim 4, wherein the client is an application function entity.

6. An apparatus, comprising:
at least one processor; and
a memory coupled to the at least one processor and having program instructions stored thereon which, when executed by the at least one processor, cause the apparatus to:
receive, from a gateway mobile location center, an indication of requiring reliable location information of a terminal device;
determine, in response to the received indication of requiring reliable location information of the terminal device, a network-assisted positioning method;
determine location information of the terminal device using the network-assisted positioning method; and
send a positioning response through the gateway mobile location center, wherein the positioning response comprises the location information of the terminal device.

7. The apparatus according claim 6, wherein the apparatus is a location management function network element.

8. A system, comprising a location management function network element and a gateway mobile location center, wherein
the gateway mobile location center is configured to:
receive a positioning request message for a terminal device; and
send a positioning data request message to the location management function network element, wherein the positioning data request message comprises an indication of requiring reliable location information of the terminal device; and
the location management function network element is configured to:
receive the indication of requiring reliable location information of the terminal device from the gateway mobile location center;
determine, in response to the received indication of requiring reliable location information of the terminal device, a network-assisted positioning method;
determine location information of the terminal device using the network-assisted positioning method; and
send a positioning response through the gateway mobile location center, wherein the positioning response comprises the location information of the terminal device.

9. The system according claim 8, further comprising the terminal device.

10. The system according claim 8, further comprising a client configured to send the positioning request message and receive the location information of the terminal device, wherein the positioning request message comprises a first indication information indicating that the client requests highly reliable positioning data.

11. The system according claim 10, wherein the client is an application function entity.

* * * * *